April 20, 1926.

T. O. WIGGINS 1,581,558

CORNSTALK CUTTING MACHINE

Filed Nov. 5, 1925

Inventor
T. O. Wiggins

Attorney

April 20, 1926.

T. O. WIGGINS 1,581,558

CORNSTALK CUTTING MACHINE

Filed Nov. 5, 1925

Inventor

T. O. Wiggins

By

Attorney

Patented Apr. 20, 1926.

1,581,558

UNITED STATES PATENT OFFICE.

TRAVIS O. WIGGINS, OF GEORGETOWN, TEXAS.

CORNSTALK-CUTTING MACHINE.

Application filed November 5, 1925. Serial No. 67,117.

*To all whom it may concern:*

Be it known that I, TRAVIS O. WIGGINS, a citizen of the United States, residing at Georgetown, in the county of Williamson, State of Texas, have invented a new and useful Cornstalk-Cutting Machine; and I do hereby declare the following to be a full, clear, and exact description of the invention, such as will enable others skilled in the art to which it appertains to make and use the same.

The invention relates to corn stalk chopping machines, and has for its object to provide a machine of this character which is preferably used in connection with a plow so that the chopping operation may take place during the plowing operation, and provided with means whereby corn stalks will be cut into relatively small sections which will easily decay on the ground, consequently will act as a fertilizer. Also to construct the mechanism whereby either green or dried stalks may be severed.

A further object is to provide a corn stalk chopping machine comprising a frame having vertically disposed rollers which revolve inwardly towards each other, a horizontally disposed chopper knife adjacent the lower ends of the rollers and cooperating with a chopper bar for severing the stalks adjacent the ground, and as they are fed through the rollers, and a vertically disposed chopper knife rearwardly of the rollers and cooperating with a pair of cutter bars for severing the stalks as they are passed rearwardly through the rollers. Also to provide ground engaging wheels for supporting the machine and a single driving connection between one of the wheels and mechanism for simultaneously operating the cutter knives and the rollers.

A further object is to provide a corn stalk cutting machine comprising a wheel supported frame, vertically disposed rollers within the frame and arcuately movable towards and away from each other, a cutter knife at the forward side of the rollers adjacent their lower ends, a transversely disposed drive shaft on the frame and having driving connections with one of the wheels, a vertically disposed rotatable knife adjacent the rear sides of the rollers and shaft and gear connections between the transversely disposed shaft and the knives and rollers for simultaneously operating the same upon rotation of the transversely disposed shaft.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
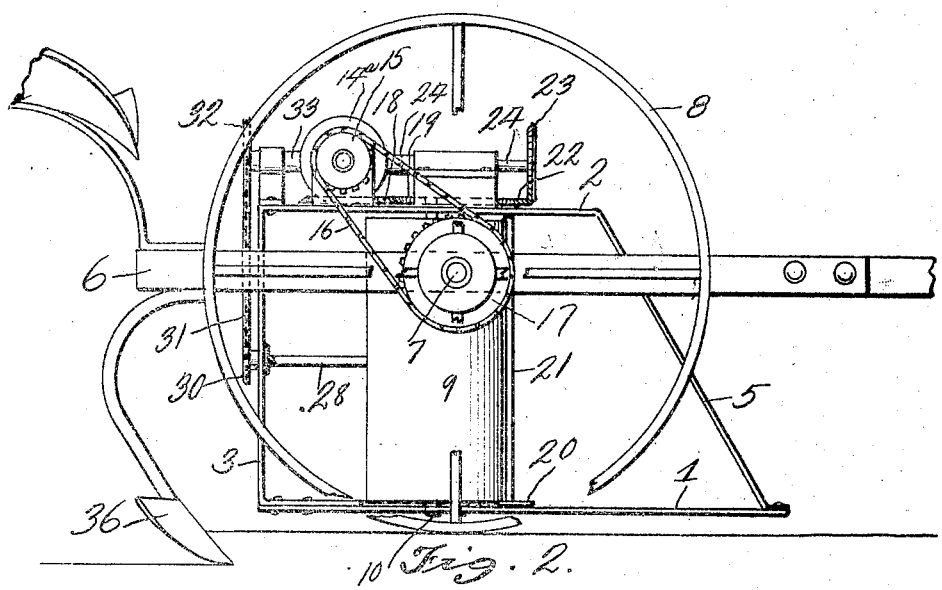
Figure 1 is a side elevation of the machine.
Figure 2:
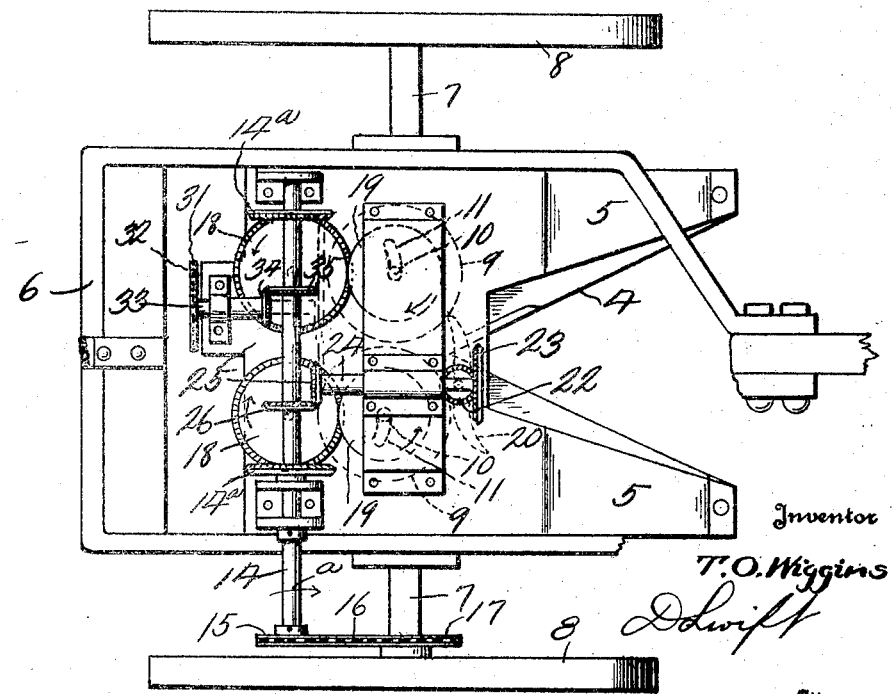
Figure 2 is a top plan view of the machine.
Figure 3:
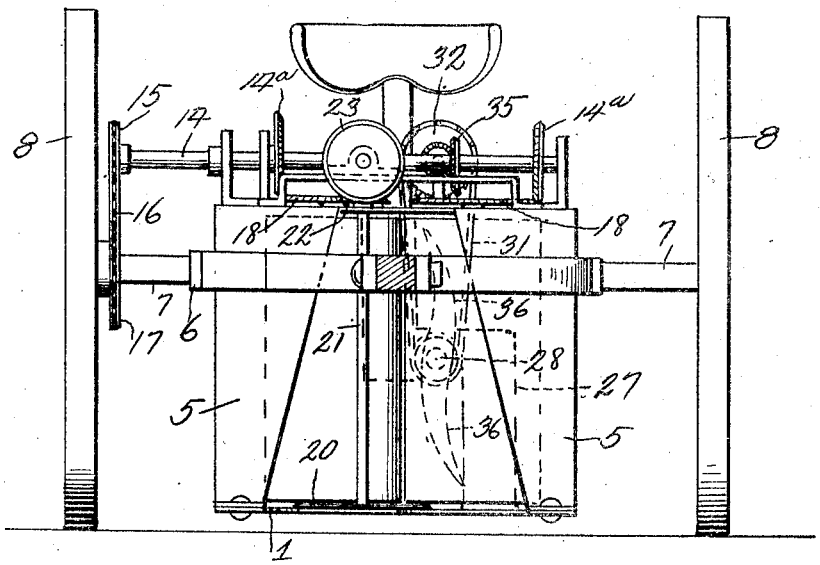
Figure 3 is a front elevation of the machine.
Figure 5:
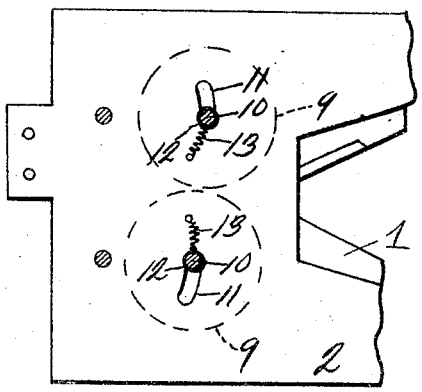
Figure 5 is a top plan view of the upper plate of the machine showing the roller guide slots.
Figure 4:
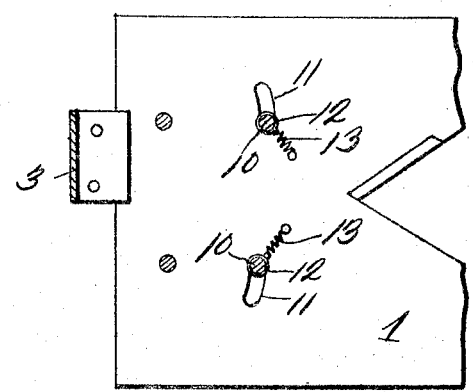
Figure 4 is a top plan view of the bottom plate of the frame showing the roller guide slots.
Figure 6:
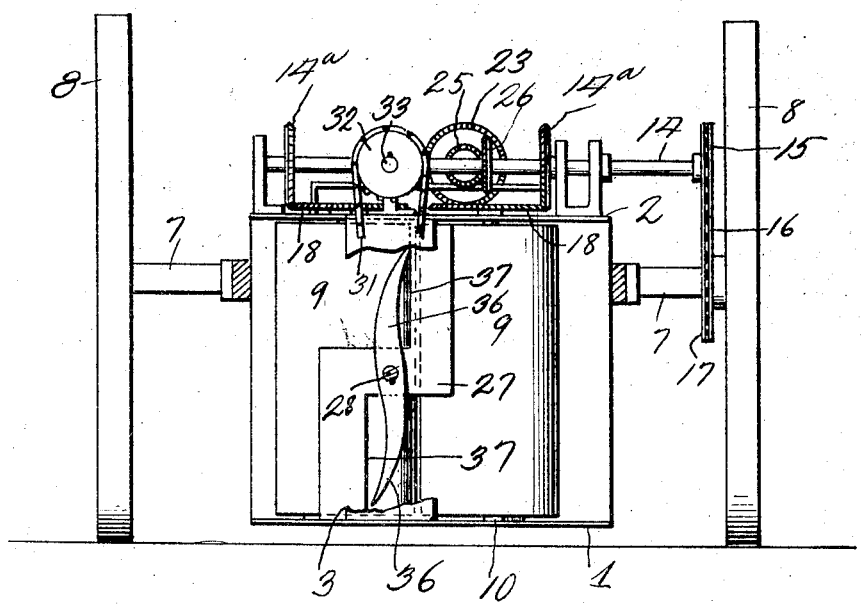
Figure 6 is a rear elevation of the machine.

Referring to the drawing, the numeral 1 designates the horizontal lower plate of the frame of the device and 2 the horizontal upper plate. The rear ends of the plates 1 and 2 are connected together by the vertically disposed plate 3. The front end of the plate 1 is provided with a V-shaped recess 4 into which the stalks of corn pass, and the forward end of the plate 2 is connected to the forward end of the plate 1 by downwardly and forwardly extending arms 5. The frame above described is supported in a horizontally disposed rectangular shaped frame 6, to the opposite sides of which are secured outwardly extending stub axles 7, on the outer ends of which are mounted ground engaging wheels 8. Rotatably mounted between the plates 1 and 2 and vertically disposed are feed rollers 9, which rotate inwardly towards each other for feeding stalks of corn rearwardly in relation to the machine. Rollers 9 have their pintles 10 rotatably mounted in arcuate slots 11 of the plates 1 and 2 and are provided with collars 12, to which anchored springs 13 are attached, and which springs 13 normally force the rollers 9 together, but at the same time allow the rollers to accommodate themselves to various thicknesses of corn stalks.

Extending transversely of the machine above the upper plate 2 and rotatably mounted in bearings is a drive shaft 14, one end of which is provided with a sprocket 15 over which a sprocket chain 16 extends. The sprocket chain 16 also extends over a sprocket chain 17 carried by one of the ground engaging wheels 8, therefore it will be seen that as the ground engaging wheel 8 rolls over the ground, rotation will be imparted to the transversely disposed shaft 14 in the direction of the arrow $a$. Rotatably mounted on the plate 2 are spaced bevelled gears 18, which bevelled gears 18 mesh with bevelled gears 19 carried by the upper pintles 10 of the rollers 9, therefore it will be seen that the bevelled gears 18 will impart rotation to the rollers 9, and by mounting the pintles 10 in the arcuate slots 11, which are concentric with the centers of the bevelled gears 18, the rollers may have freedom of movement outwardly and inwardly according to the thickness of the corn stalks that are fed between the rollers, and the bevelled gears 18 and 19 will remain in mesh during the movement. Rotatably mounted in bearings of the plates 1 and 2 forwardly of the rollers 9 is a horizontally disposed double ended severing knife 20, the ends of which extend under the lower ends of the rollers during their rotation. As the knife 20 is rotated at a high rate of speed, the corn stalks will be severed and allowed to be gripped by the rollers for feeding the same rearwardly and partly crushing the same. Cutter knife 20 is carried by a vertically disposed shaft 21 which extends upwardly through the upper plate 2 and is provided with a bevelled gear 22. Bevelled gear 22 meshes with the bevelled gear 23 carried by a horizontally disposed shaft 24 on the upper side of the plate 2 and which shaft has its rear end provided with a bevelled gear 25, which meshes with a bevelled gear 26 carried by the shaft 14, therefore it will be seen that motion is imparted to the cutter knife 20 from the ground engaging wheel 8 through the shaft 14 and through the mechanism above set forth.

Rotatably mounted in a bearing in the plate 3 and a bearing in the double zigzag shaped cutter bar 27, adjacent the rear sides of the rollers 9 is a rearwardly extending horizontally disposed shaft 28. The rear end of the shaft 28 is provided with a bevelled gear 30 over which a sprocket chain 31 extends. The sprocket chain 31 extends upwardly and over a sprocket 32, which is carried by a forwardly extending shaft 33. Shaft 33 extends forwardly and terminates in a bevelled gear 34, which meshes with a bevelled gear 35 on the shaft 14, therefore it will be seen that rotation is imparted to the shaft 28 from the ground engaging wheel 8 through the shaft 14. The forward end of the shaft 28 is provided with a double ended cutter blade 36, which cooperates with the shearing edges 37 of the cutter bar 27, therefore it will be seen that there is a double shearing action or operation on the corn stalks as they are fed rearwardly from between the rollers 9, and said corn stalks will be severed into relatively short sections, which sections, when they drop on the ground, will eventually rapidly decay and fertilize the ground. It will also be seen that the rollers will partially crush the corn stalks, thereby causing the same to rapidly disintegrate incident to the weather when left on the ground. Disposed rearwardly of the machine is a plow 36, which plow, after the stalk severing operation will turn the stalk sections under and at the same time will allow a stalk cutting operation and a plowing operation to be accomplished at the same time.

Shaft 14 is provided with bevelled gears 14$^a$ and which bevelled gears mesh with the bevelled gears 18 which in turn mesh with bevelled gears 19 for imparting rotation to the feeding drums 9, therefore it will be seen that the power for driving all the mechanism of the device is obtained from the single ground engaging wheel 8, thereby insuring a positive operation of the device at all times.

The invention having been set forth what is claimed as new and useful is:—

1. A corn stalk severing machine comprising a frame, ground engaging wheels supporting said frame, vertically disposed gripping rollers rotatably mounted within the frame, a cutter knife rotatably mounted adjacent the lower ends of the rollers forwardly thereof, a vertically disposed shaft carried by said cutter knife, a transversely disposed operating shaft carried by the frame, driving connections between the transversely disposed shaft and the upwardly extending shaft of the cutter knife, a cutter knife disposed rearwardly of the rollers in a transverse vertical plane, driving connections between the transverse shaft and the last named cutter knife, driving connections between the transverse shaft and the rollers and driving connections between the transverse shaft and one of the ground engaging wheels.

2. The combination with a stalk chopping machine comprising. a wheel supported frame, vertically disposed gripping rollers rotatably mounted in arcuate bearings of the frame, a cutter knife horizontally disposed forwardly of the rollers adjacent their lower ends, a cutter knife rotatably mounted in a vertical transverse plane rearwardly of the rollers, of driving means for said rollers and cutter knives, said driving mechanism comprising a transversely disposed shaft, driving connections between said shaft and one of the wheels, idle bevel gears carried by the frame below the shaft, bevelled gears carried by the rollers and meshing with said last named bevelled gears, said arcuate bearings being concentric with the gears below the shaft, gear connections between the shaft and the last named bevelled gears and driving connections between the shaft and the cutters at opposite sides of the shaft.

In testimony whereof I have signed my name to this specification.

TRAVIS O. WIGGINS.